(12) United States Patent
Ghosh et al.

(10) Patent No.: US 9,763,238 B2
(45) Date of Patent: Sep. 12, 2017

(54) SIGNALING UPLINK FRAME DURATION IN WIRELESS LOCAL-AREA NETWORKS

(71) Applicant: Intel Corporation, Santa Clara, CA (US)

(72) Inventors: Chittabrata Ghosh, Fremont, CA (US); Yaron Alpert, Hod Hasharoni (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/343,744

(22) Filed: Nov. 4, 2016

(65) Prior Publication Data
US 2017/0164351 A1    Jun. 8, 2017

Related U.S. Application Data

(60) Provisional application No. 62/250,582, filed on Nov. 4, 2015.

(51) Int. Cl.
*H04W 72/04* (2009.01)
*H04L 5/00* (2006.01)
*H04W 84/12* (2009.01)

(52) U.S. Cl.
CPC ....... *H04W 72/0413* (2013.01); *H04L 5/0055* (2013.01); *H04W 72/048* (2013.01); *H04W 72/0406* (2013.01); *H04W 72/0446* (2013.01); *H04W 72/0453* (2013.01); *H04W 84/12* (2013.01)

(58) Field of Classification Search
CPC . H04W 84/12; H04W 28/06; H04W 72/0406; H04W 72/0446; H04W 72/0453; H04W 74/002; H04W 74/04; H04W 74/0808; H04W 74/0816; H04L 1/0003; H04L 1/0042; H04L 5/0053; H04L 5/0091; H04L 5/0037
See application file for complete search history.

(56) References Cited

U.S. PATENT DOCUMENTS 9,020,547 B2 * 4/2015 Amann ............ H04W 74/0891
    370/324
2016/0057657 A1 * 2/2016 Seok ................ H04L 69/324
    370/476

(Continued)

*Primary Examiner* — Olumide T Ajibade Akonai
(74) *Attorney, Agent, or Firm* — Schwegman Lundberg & Woessner, P.A.

(57) ABSTRACT

Computing readable media, apparatuses, and methods for signaling UL frame duration in wireless local-area networks. An apparatus of a wireless device is disclosed. The apparatus comprising processing circuitry, the processing circuitry configured to: encode a trigger frame for an uplink (UL) multi-user (MU) communication, the trigger frame including a media access control (MAC) portion including one or more station identifications and a length field to indicate an UL physical layer convergence procedure (PLCP) protocol data unit (PPDU) (UL-PPDU) length, the MAC portion further including a duration field to indicate a time period for other stations to set network allocation vectors. The processing circuitry further configured to: configure the access point to transmit the trigger frame, and decode UL-PPDUs from one or more stations identified by the one or more stations identifications, where a length of each of the UL-PPDUs is to be in accordance with the UL-PPDU length.

24 Claims, 7 Drawing Sheets

(56) References Cited

U.S. PATENT DOCUMENTS

| | | | |
|---|---|---|---|
| 2016/0099796 A1* | 4/2016 | Yang | H03M 13/1177 714/776 |
| 2016/0142232 A1* | 5/2016 | Gao | H04L 27/0008 370/329 |

* cited by examiner

SIGNALING UPLINK FRAME DURATION IN WIRELESS LOCAL-AREA NETWORKS

PRIORITY CLAIM

This application claims the benefit of priority under 35 USC 119(e) to U.S. Provisional Patent Application Ser. No. 62/250,582, filed Nov. 4, 2015, which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for signaling uplink (UL) frame duration in wireless local-area networks (WLANS).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
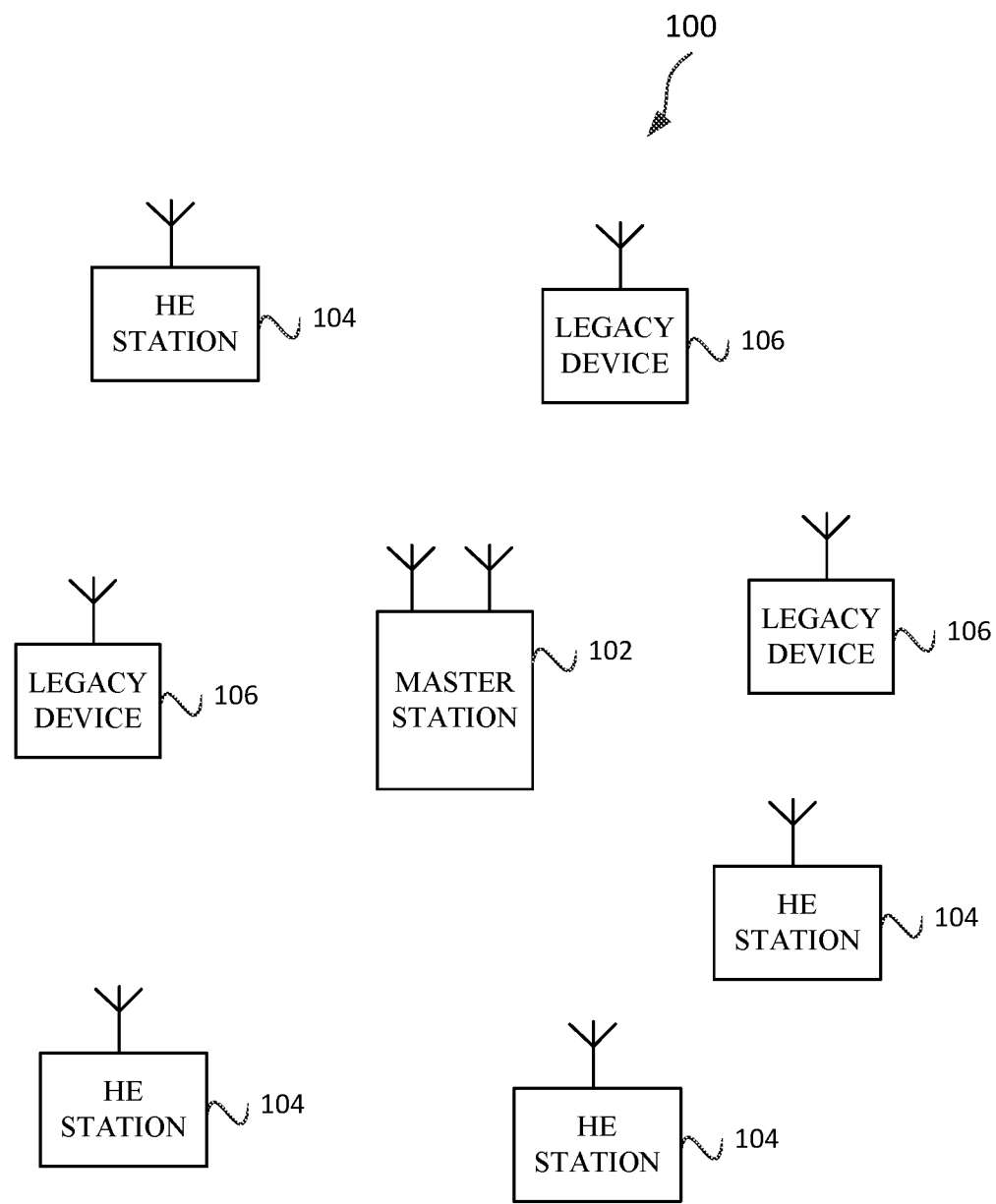
FIG. 1 illustrates a WLAN in accordance with some embodiments.

FIG. 1 illustrates a WLAN 100 in accordance with some embodiments. The WLAN 100 may comprise a basis service set (BSS) 100 that may include a master station 102, which may be an AP, a plurality of high-efficiency wireless (e.g., IEEE 802.11ax) (HE) stations 104, and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one master station 102 that is part of an extended service set (ESS). A controller (not illustrated) may store information that is common to the more than one master stations 102.

The legacy devices 106 may operate in accordance with one or more of IEEE 802.11 a/b/g/n/ac/ad/af/ah/aj/ay, or another legacy wireless communication standard. The legacy devices 106 may be STAs or IEEE STAs. The HE STAs 104 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 104 may be termed high efficiency (HE) stations.

The master station 102 may communicate with legacy devices 106 in accordance with legacy IEEE 802.11 communication techniques. In example embodiments, the master station 102 may also be configured to communicate with HE STAs 104 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 Hz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160

MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the master station 102, HE STA 104, and/or legacy device 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit a HE master-sync transmission, which may be a trigger frame or HE control and schedule transmission, at the beginning of the HE control period. The master station 102 may transmit a time duration of the TXOP and sub-channel information. During the HE control period, HE STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HE control period, the master station 102 may communicate with HE stations 104 using one or more HE frames. During the HE control period, the HE STAs 104 may operate on a sub-channel smaller than the operating range of the master station 102. During the HE control period, legacy stations refrain from communicating. The legacy stations may need to receive the communication from the master station 102 to defer from communicating.

In accordance with some embodiments, during the TXOP the HE STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The master station 102 may also communicate with legacy stations 106 and/or HE stations 104 in accordance with legacy IEEE 802.11 communication techniques. In some embodiments, the master station 102 may also be configurable to communicate with HE stations 104 outside the HE TXOP in accordance with legacy IEEE 802.11 communication techniques, although this is not a requirement.

In some embodiments the HE station 104 may be a "group owner" (GO) for peer-to-peer modes of operation. A wireless device may be a HE station 102 or a master station 102.

In some embodiments, the HE station 104 and/or master station 102 may be configured to operate in accordance with IEEE 802.11mc.

In example embodiments, the HE station 104 and/or the master station 102 are configured to perform the methods and functions described herein in conjunction with FIGS. 1-7.

Figure 2:
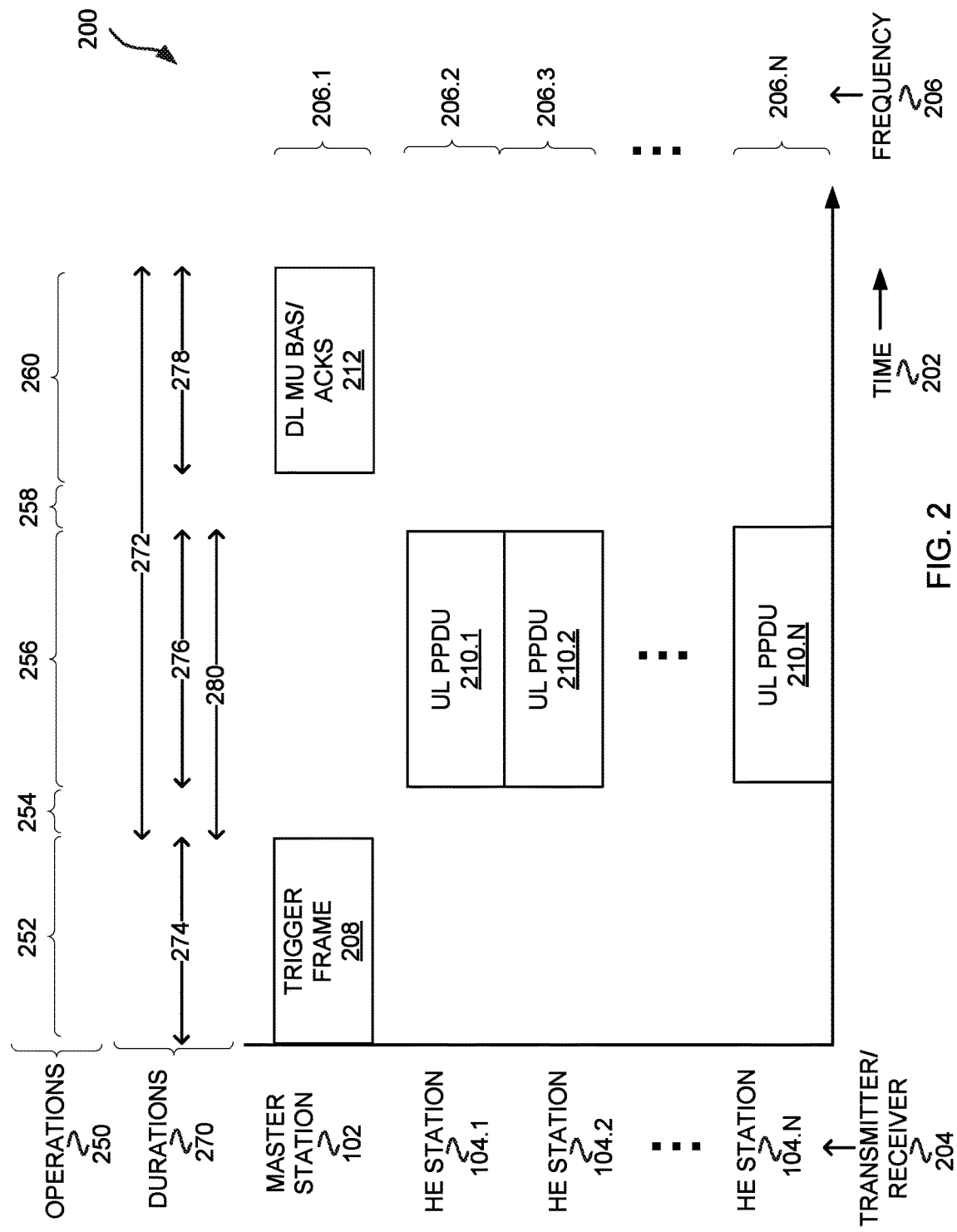
FIG. 2 illustrates a method of signaling UL frame duration in WLANs in accordance with some embodiments.
Figure 3:
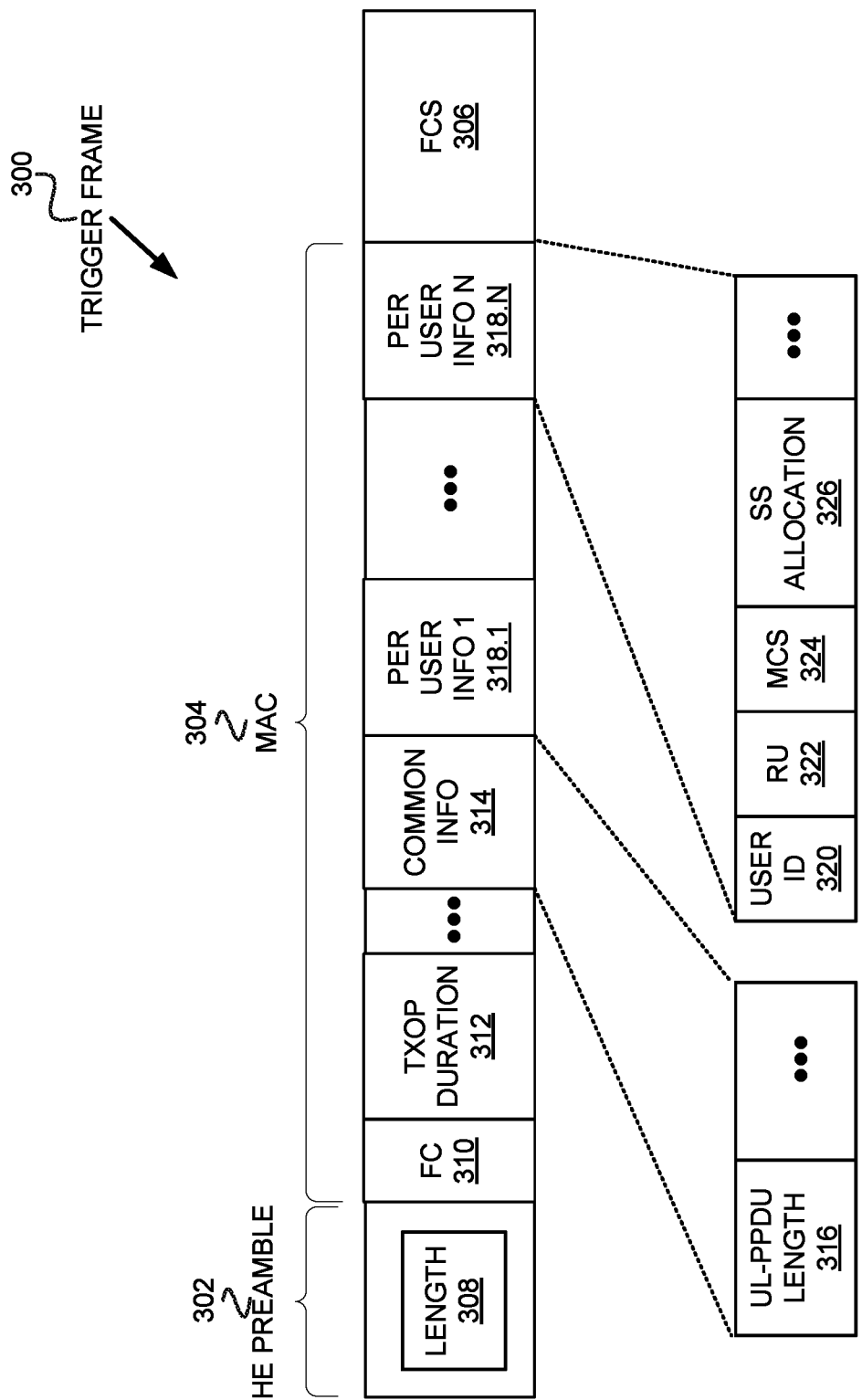
FIG. 3 illustrates a trigger frame in accordance with some embodiments.
Figure 4:
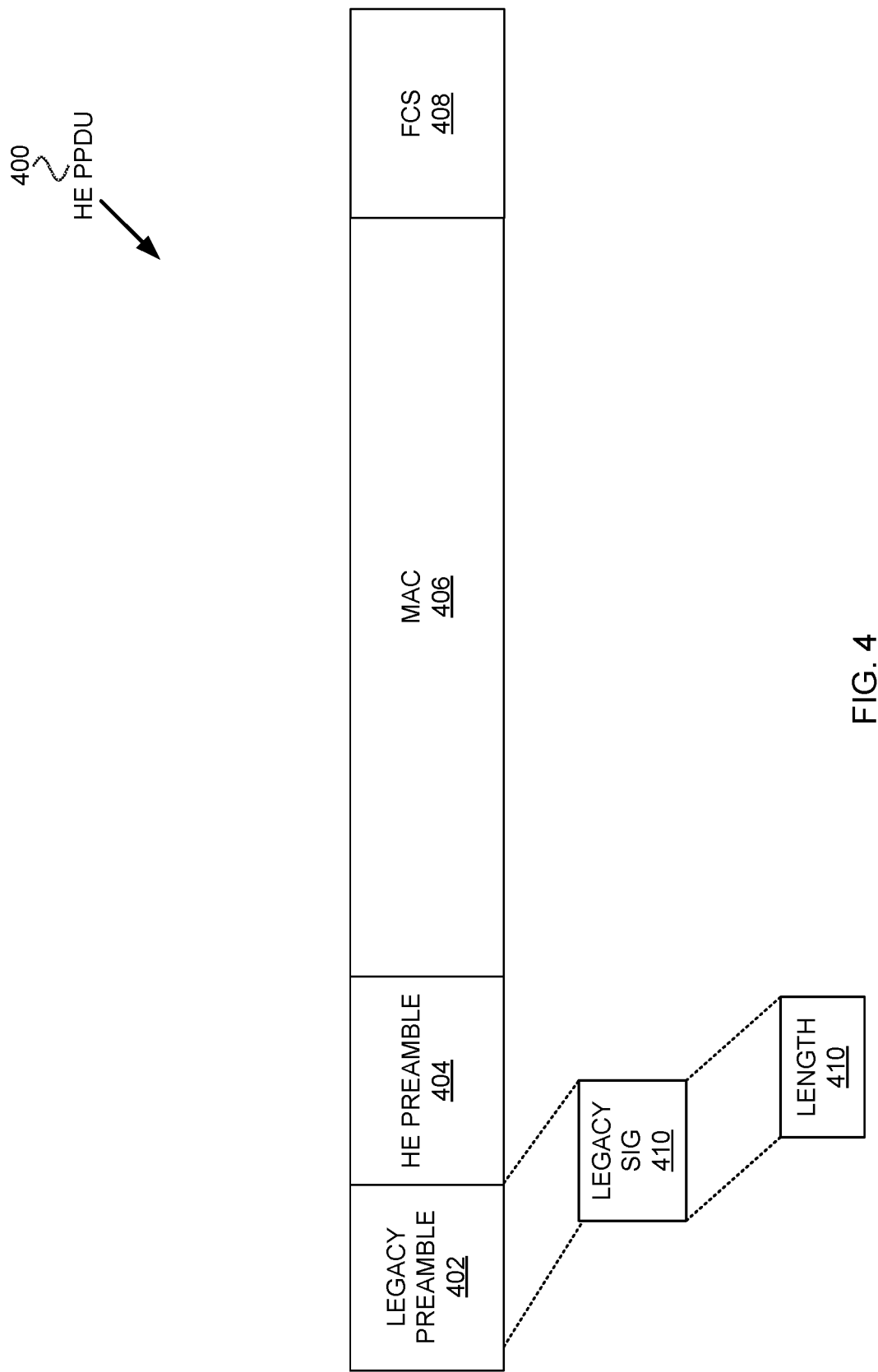
FIG. 4 illustrates a HE PPDU in accordance with some embodiments.

FIG. 2 illustrates a method 200 of signaling UL frame duration in WLANs in accordance with some embodiments. FIGS. 2-4 are disclosed in conjunction with one another. Illustrated in FIG. 2 is time 202 along a horizontal axis, transmitter/receiver 204 along a vertical axis on the left, frequency 206 along a vertical axis on the right, operations 250 along the top, and durations 270 along the top below the operations 250.

The transmitters/receivers 204 may include master station 102 and HE stations 104. The frequencies 206 are channels which have a bandwidth as described herein. The frequencies 206.2 through 206.N may overlap with frequency 206.1, since the frequency 206 used by the master station 102 is not use for operation 256. Moreover, the frequency 206 used by the HE stations 104 may overlap with one another when MU-MIMO is used.

The method 200 may begin at operation 252 with the master station 102 transmitting trigger frame 208 to HE stations 104. The trigger frame 208 may be a trigger frame 300 as illustrated in FIG. 3.

FIG. 3 illustrates a trigger frame 300 in accordance with some embodiments. The trigger frame 300 comprises an HE preamble 302 portion, media access control (MAC) 304 portion, and a frame control sequence (FCS) 306. The HE preamble 302 may include a length 308 which may indicate a duration of the trigger frame 300, which may be used by other devices to defer using the wireless medium for the duration indicated by the length 308. The MAC 304 portion includes a frame control (FC) 310, TXOP duration 312, common information 314, and per user information 1 318.1 through per user information N 318.N.

The FC 310 may include control information such as protocol version. The TXOP duration 312 may be a duration or length for non-participating HE stations 104 do defer. E.g., the TXOP duration 312 may be duration 272.

The common information 314 may be common information for one or more users, e.g., HE stations 104, for resource allocation for an UL MU communication. The common information 314 may include an UL-PPDU length 316 field and one or more additional fields. The UL-PPDU length 316 field may indicate a duration or length for the UL-PPDUs 210. For example, the UL-PPDU length 316 field may indicate a length in octets for the UL-PPDUs 210. In some embodiments, the HE stations 104 are to use the value of the UL-PPDU length 316 field as the value of the length 410

(FIG. 4) of the legacy SIG 410. In some embodiments, the UL-PPDU length 316 may indicate a duration in seconds or milli or micro seconds.

The per user information 318 may include user identification (ID) 320, RU 322, modulation and coding scheme (MCS) 324, spatial stream (SS) allocation 326, and one or more additional fields. The user ID 320 may be an association ID. The RU 322 may indicate a channel for the HE station 104 to transmit the UL PPDU 210. The MCS 324 may indicate a modulation and coding scheme for the UL PPDU 210, e.g., it may indicate the MCS for the data portion of the UL PPDU 210 or the HE portion of the UL PPDU 210. The SS allocation 326 may indicate a spatial stream allocation for the HE station 104. The HE station 104 may transmit UL PPDUs 210 on a same RU 322 on different spatial streams.

The FCS 306 may include information to enable the receiver of the trigger frame 300 to determine the integrity of the trigger frame 300. In some embodiments, one or more of the fields of the trigger frame 300 may be included in a resource allocation element (RAE) or resource allocation information element (RAIE), which may be transmitted by a different type of packet.

Returning to FIG. 2, the master station 102 may set length 308 so that other wireless devices can determine the duration 274 of the trigger frame. The master station 102 may set the TXOP duration 312 to indicate how long non-participating wireless devices may set their NAV for. The master station 102 may set UL-PPDU length 316 to indicate to the HE stations 104 the length of the UL PPDU 210 to transmit. For example, UL-PPDU length 316 may indicate a length (e.g., octets or bytes) or a duration (e.g., milli or micro seconds).

The method 200 continues at operation 254 with the HE stations 104 waiting a period time after receiving the trigger frame 208. The period of time may be a short inter-frame space (SIFS) or anther period of time, e.g extended inter-frame space (EIFS) or distributed coordinated function (DCF) inter-frame space (DIFS).

The method 200 continues at operation 256 with the HE stations 104 transmitting UL PPDUs 210 in accordance with the trigger frame 208. FIG. 4 illustrates a HE PPDU 400 in accordance with some embodiments. The HE PPDU 400 includes a legacy preamble 402 portion, HE preamble 404 portion, MAC 406 portion, and FCS 408 portion. The legacy preamble 402 may include a legacy signal (SIG) 410 field which may include a length 410. The length 410 may be number of octets or another indication of a length. The legacy SIG 410 may include additional fields to enable wireless devices to determine a duration or period of time for the HE PPDU 400, e.g., the legacy SIG 410 may include an indication of a data rate (e.g., millions of bits per second), a modulation (e.g., BPSK, QPSK, 16-QAM, or 64-QAM), and a coding rate (e.g., ½, ¾, or ⅔). The length 410 may indicate a period of time, e.g. milli or micros seconds.

The HE preamble 404 portion may include one or more fields such as repeated L-SIG and HE-SIG-A. The MAC 406 portion may include UL data for the master station 102. The FCS 408 may be the same or similar to FCS 306.

Returning to FIG. 2, the HE stations 104 may encode the UL PPDUs 210 to have duration 276 based on a UL-PPDU length 316 of the trigger frame 208. A length 410 field of the HE PPDUs 210 may indicate the duration 276, which may be longer than an actual duration of the UL-PPDU 210.

The method 200 continues at operation 258 with the master station 102 waiting a period time after receiving the UL PPDUs 210. The period of time may be a short inter-frame space (SIFS) or anther period of time, e.g. extended inter-frame space (EIFS) or distributed coordinated function (DCF) inter-frame space (DIFS).

The method 200 may optionally continue with the master station 102 transmitting DL MU block acknowledgements (BAs)/acknowledgements (ACKs) 212 to the HE stations 104. The DL MU BAs/ACKs 212 may be transmitted in accordance with an indication in the trigger frame 208. The DL MU BAs/ACKs 212 may be transmitted on a different frequency 206 than the master station 102 received the UL PPDUs 210. The DL MUs/ACKs 212 may have a duration of 278.

The method 200 may end. In some embodiments, the master station 102 may initiate another UL PPDU communication by transmitting another trigger frame 208. In some embodiments, the master station 102 may include a downlink (DL) data portion before the UL PPDU 210.

In some embodiments, the trigger frame 300 and/or HE PPDU 400 may include a TXOP duration indication in a HE-SIG-A field, which is part of the HE preamble 302, and HE preamble 404, respectively. In some embodiments, since MAC protocol data units (MPDUs) from multiple traffic IDs may be aggregated into aggregated MPDUs (A-MPDUs) per HE station 104, the size of the DL MU BAs/ACKs 212 may be variable. The MPDUs and A-MPDUs are transmitted in PPDUs. In some embodiments, the TXOP duration 312 field of the trigger frame 300 indicates the duration of the UL PPDUs 210 and/or the UL data in the UL PPDUs to the HE stations 104.

In some embodiments, the duration 278 of the DL MU BAs/ACKs 212 is indicated by the TXOP duration 312. In some embodiments, the length of the TXOP duration 272 is indicated in the HE-SIG-A of the trigger frame 208 and the duration 278 of the DL MU BAs/ACKs 212 is indicated in the TXOP duration 312 of the trigger frame 208. In some embodiments, the duration 276 of the UL PPDU 210 is indicated in the HE preamble 302 of the trigger frame 300 (208), e.g., a L-SIG length field. The HE preamble 302 may include a physical (PHY) header, which may include a L-SIG length field. In some embodiments, the TXOP duration 312 may be set to duration 280, which would enable the master station 102 to extend the TXOP by transmitting after the UL PPDUs 210.

In some embodiments, the trigger frame 210 may include a DL data resource allocation indication for HE stations 104 in a HE-SIG-B. In these embodiments, the HE stations 104 may transmit UL BAs/ACKs in response to the MU DL data. In some embodiments, the TXOP duration 312 indicates the duration of the UL BAs/ACKs from the HE stations 104. In some embodiments, where there are multiple UL PPDU operations 256, the trigger frame 208 may include a field for duration 276 of the UL PPDUs 210 and a field for duration 276 plus duration 278.

In some embodiments, the HE stations 104 may enter a power save mode if they are not indicated to be include in a resource allocation in the trigger frame 208. The length of the power save mode may be determined based on one or more of the fields that indicate a length or duration of the UL PPDUs 210 and/or DL MU BAs/ACKs 212.

Figure 5:
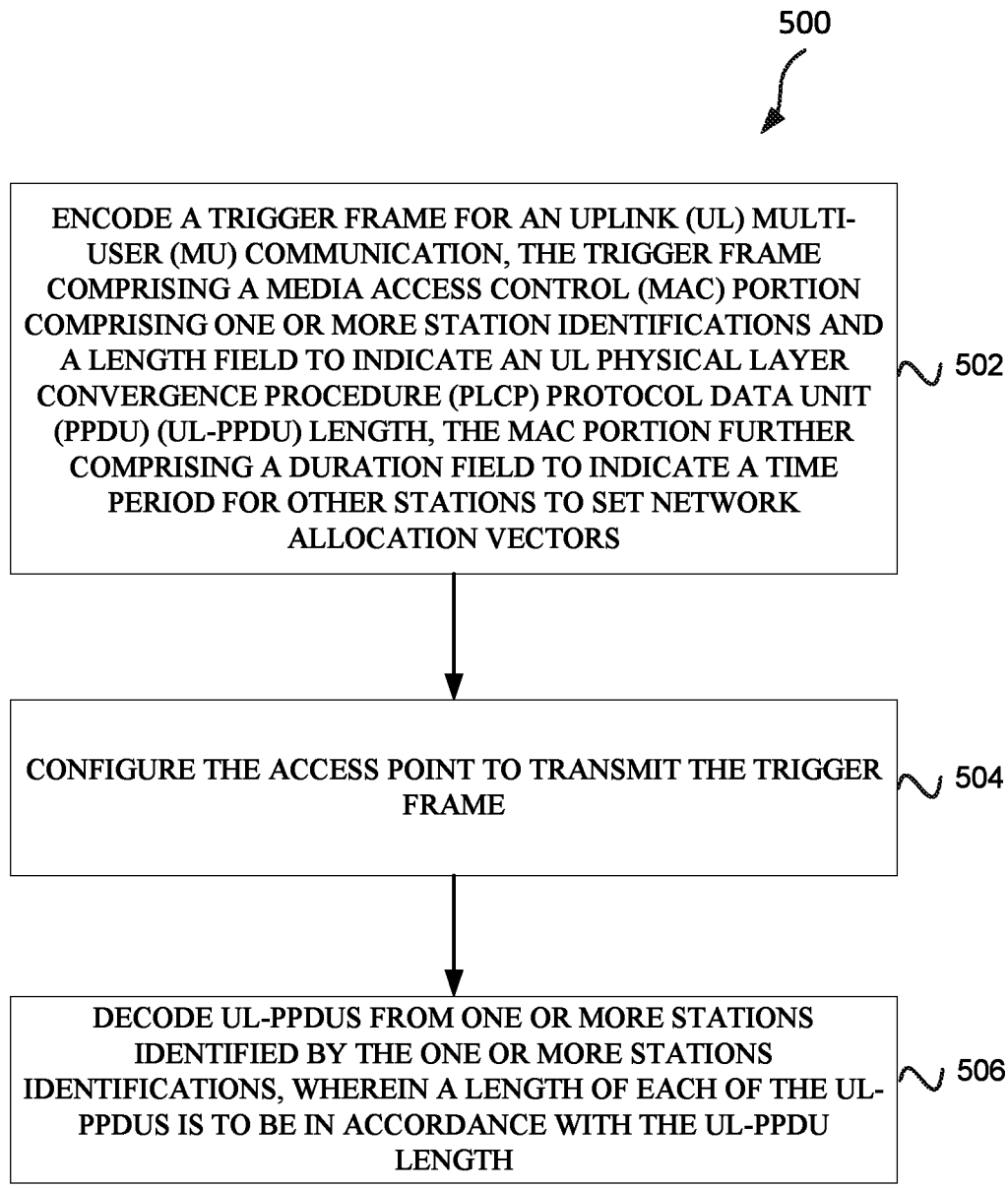
FIG. 5 illustrates a method of signaling UL frame duration in WLANs in accordance with some embodiments.

FIG. 5 illustrates a method 500 of signaling UL frame duration in WLANs in accordance with some embodiments. The method 500 begins at operation 502 with encode a trigger frame for an uplink (UL) multi-user (MU) communication, the trigger frame comprising a media access control (MAC) portion comprising one or more station identifications and a length field to indicate an UL-PPDU length, the MAC portion further comprising a duration field to indicate a time period for other stations to set network allocation vectors. For example, master station 102 of FIG. 2 (or an apparatus of the master station 102) may transmit trigger frame 208 that includes length 308 to indicate to the HE stations 104 a length for the UL PPDUs 210, and TXOP duration 312 which may be set to duration 272.

The method 500 continues at operation 504 with configuring the wireless device to transmit the trigger frame. For example, an apparatus of the master station 102 may configure the master station 102 to transmit the trigger frame 208.

The method 500 optionally continues at operation 506 with decode UL-PPDUs from one or more stations identified by the one or more stations identifications, wherein a length of each of the UL-PPDUs is to be in accordance with the UL-PPDU length. For example, the master station 102 (or an apparatus of the master station 102) may decode UL PPDUs 210. The duration 276 is based on the length for UL-PPDUs of the trigger frame.

Figure 6:
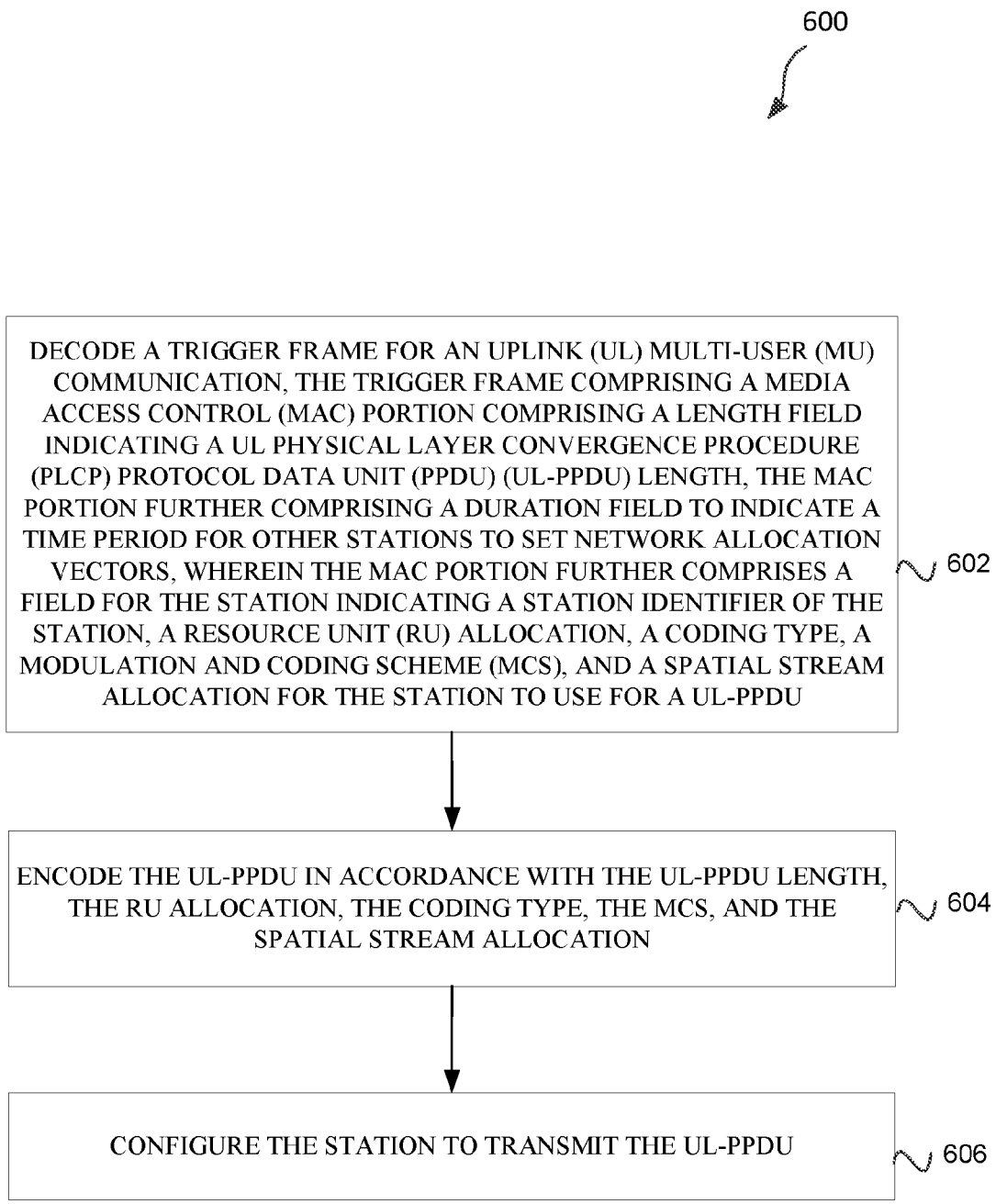
FIG. 6 illustrates a method of signaling UL frame duration in WLANs in accordance with some embodiments.

FIG. 6 illustrates a method 600 of signaling UL frame duration in WLANs in accordance with some embodiments. The method 600 begins at operation 602 with decoding a trigger frame for an UL MU communication, the trigger frame comprising a MAC portion comprising a length field indicating a UL-PPDU length, the MAC portion further comprising a duration field to indicate a time period for other stations to set network allocation vectors, wherein the MAC portion further comprises a field for the station indicating a station identifier of the station, a RU allocation, a coding type, a MCS, and a spatial stream allocation for the station to use for a UL-PPDU.

For example, HE stations 104 of FIG. 2 (or an apparatus of the HE station 104) may decode trigger frame 208 that includes length 308 to indicate to the HE stations 104 a length for the UL PPDUs 210, and TXOP duration 312 which may be set to duration 272. The trigger frame 208 may further include user ID 320, RU 322, MCS 324, and SS allocation 326.

The method 600 continues at operation 604 with encoding the UL-PPDU in accordance with the UL-PPDU length, the RU allocation, the coding type, the MCS, and the spatial stream allocation. For example, the HE stations 104 may encode UL PPDU 210 in accordance with length 308, RU 322, MCS 324, and SS allocation 326.

The method 600 continues at operation 606 with configuring the station to transmit the UL-PPDU to the access point. For example, an apparatus of HE stations 104 (FIG. 2) may configure the HE stations 104 to transmit the UL-PPDUs 210.

Figure 7:
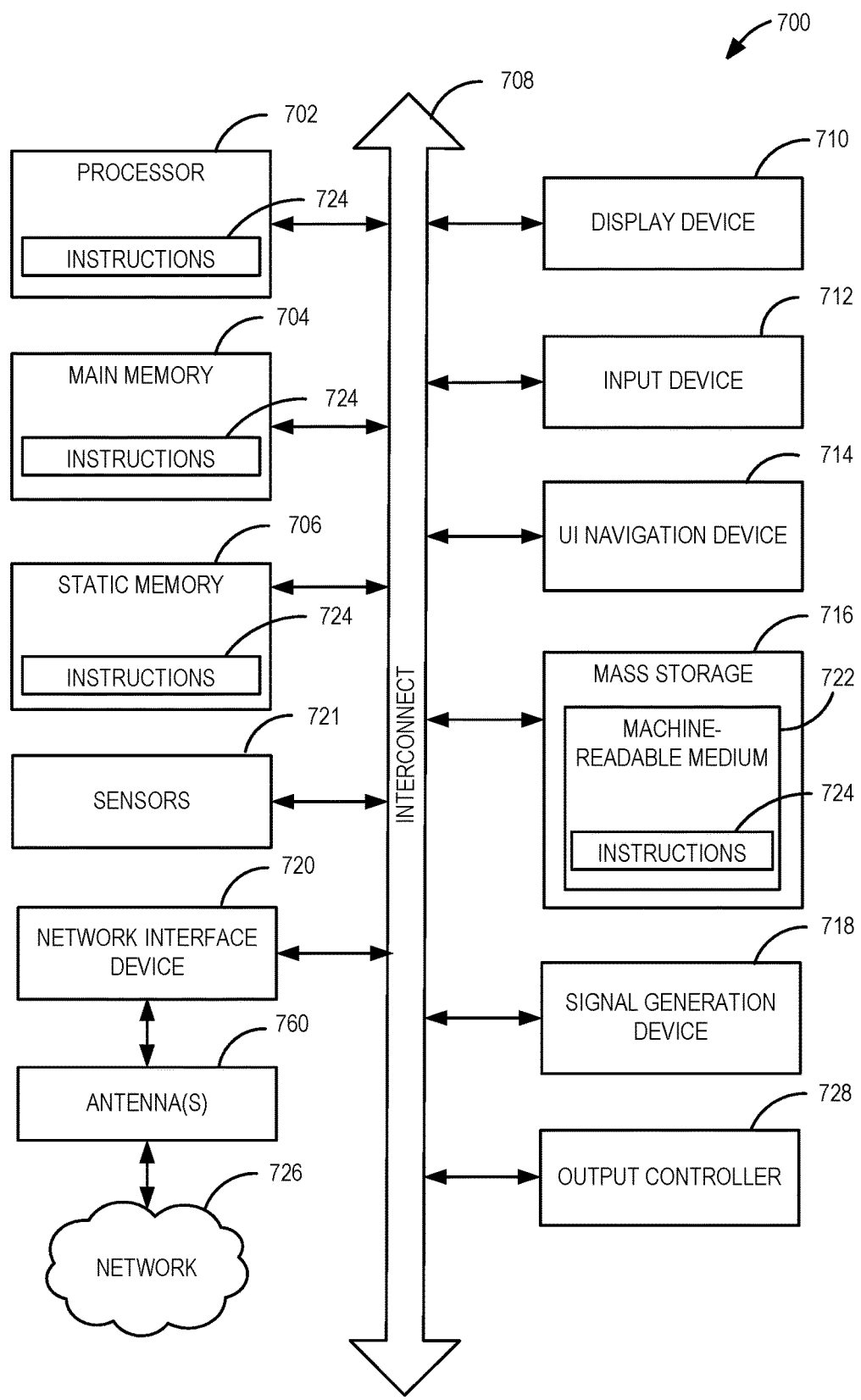
FIG. 7 illustrates a block diagram of an example machine upon which any one or more of the techniques (e.g., methodologies) discussed herein may perform.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a master station 102, HE station 104, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708.

Specific examples of main memory 704 include Random Access Memory (RAM), and semiconductor memory devices, which may include, in some embodiments, storage locations in semiconductors such as registers. Specific examples of static memory 706 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 700 may further include a display device 710, an input device 712 (e.g., a keyboard), and a user interface (UI) navigation device 714 (e.g., a mouse). In an example, the display device 710, input device 712 and UI navigation device 714 may be a touch screen display. The machine 700 may additionally include a mass storage (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 702 and/or instructions 724 may comprise processing circuitry and/or transceiver circuitry.

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 722 is illustrated as a single medium, the term "machine readable medium" may include a single medium or multiple media (e.g., a centralized or distributed database, and/or associated caches and servers) configured to store the one or more instructions 724.

An apparatus of the machine 700 may be one or more of a hardware processor 702 (e.g., a central processing unit (CPU), a graphics processing unit (GPU), a hardware processor core, or any combination thereof), a main memory 704 and a static memory 706, sensors 721, network interface device 720, antennas 760, a display device 710, an input device 712, a UI navigation device 714, a mass storage 716, instructions 724, a signal generation device 718, and an output controller 728. The apparatus may be configured to perform one or more of the methods and/or operations disclosed herein. The apparatus may be intended as a component of the machine 700 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 720 may include one or more physical jacks (e.g., Ethernet, coaxial, or phone jacks) or one or more antennas to connect to the communications network 726. In an example, the network interface device 720 may include one or more antennas 760 to wirelessly communicate using at least one of single-input multiple-output (SIMO), multiple-input multiple-output (MIMO), or multiple-input single-output (MISO) techniques. In some examples, the network interface device 720 may wirelessly communicate using Multiple User MIMO techniques. The term "transmission medium" shall be taken to include any intangible medium that is capable of storing, encoding or carrying instructions for execution by the machine 700, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples disclose further embodiments. Example 1 is an apparatus of an access point including: memory; and processing circuitry coupled to the memory, the processing circuitry configured to: encode a trigger frame for an uplink (UL) multi-user (MU) communication, the trigger frame including a media access control (MAC) portion including one or more station identifications and a length field to indicate an UL physical layer convergence procedure (PLCP) protocol data unit (PPDU) (UL-PPDU) length, the MAC portion further including a duration field to indicate a time period for other stations to set network allocation vectors; configure the access point to transmit the trigger frame; and decode UL-PPDUs from one or more stations identified by the one or more stations identifications, where a length of each of the UL-PPDUs is to be in accordance with the UL-PPDU length.

In Example 2, the subject matter of Example 1 optionally includes where the UL-PPDU length indicates a number of octets for the length of the UL-PPDUs.

In Example 3, the subject matter of any one or more of Examples 1-2 optionally include where the trigger frame is transmitted as part of a downlink PPDU, and where the trigger frame further comprises a preamble including a legacy signal field including a second length field indicating a length of the downlink PPDU.

In Example 4, the subject matter of any one or more of Examples 1-3 optionally include where the UL-PPDU length indicates a time period in microseconds.

In Example 5, the subject matter of any one or more of Examples 1-4 optionally include where the trigger frame further comprises a second duration field to indicate a duration including a time for the UL-PPDUs to be transmitted plus a short inter frame spacing (SIFS) time and a time for a downlink (DL) multi-user (MU) block acknowledgements (BAs) or acknowledgements (ACKs) to be transmitted.

In Example 6, the subject matter of any one or more of Examples 1-5 optionally include where the MAC portion further comprises per station fields each per station field indicating a resource unit (RU) allocation, a coding type, a modulation and coding scheme (MCS), and a spatial stream allocation for a station of the one or more stations to use for a corresponding UL-PPDU of the UL-PPDUs, and where the processing circuitry is further configured to: decode the UL-PPDUs one from each of the one or more stations identified by the one or more stations identifications, where the length of each of the UL-PPDUs is to be in accordance with the UL-PPDU length, and where the decoding is in accordance with a corresponding RU allocation, a corresponding coding type, a corresponding MCS, and a corresponding spatial stream.

In Example 7, the subject matter of any one or more of Examples 1-6 optionally include where the duration field is set to a first time for transmission of the UL-PPDUs, plus a second time for a downlink (DL) multi-user (MU) block acknowledgements (BAs) or acknowledgements (ACKs) (DL MU BAs/ACKs) transmission from the access point to the one or more stations, and plus a first delay time for the one or more stations to wait to transmit the UL-PPDUs after receiving the trigger frame and a second delay time for the access point to wait before transmitting the DL MU BAs/ACKs after receiving the UL-PPDUs.

In Example 8, the subject matter of any one or more of Examples 1-7 optionally include where the duration field is set to at least extend to a time when the UL-PPDUs are to have finished being transmitted.

In Example 9, the subject matter of any one or more of Examples 1-8 optionally include where the processing circuitry is further configured to: encode the trigger frame to further comprise downlink (DL) resource allocations in a high-efficiency (HE) signal B field for the one or more stations and encode the trigger frame to further comprise DL data in accordance with the DL resource allocations for the one of the one or more stations; and, where the duration field includes a time for the access point to transmit the encoded data.

In Example 10, the subject matter of any one or more of Examples 1-9 optionally include where the UL-PPDU length indicates a value to be used for a second length field of a legacy signal field of each of the UL-PPDUs.

In Example 11, the subject matter of any one or more of Examples 1-10 optionally include access point.

In Example 12, the subject matter of any one or more of Examples 1-11 optionally include where the one or more stations identified by the one or more stations identifications comprise at least two stations.

In Example 13, the subject matter of any one or more of Examples 11-12 optionally include transceiver circuitry coupled to the processing circuitry; and, one or more antennas coupled to the transceiver circuitry.

Example 14 is a non-transitory computer-readable storage medium that stores instructions for execution by one or more processors, the instructions to configure the one or more processors to cause an apparatus of an access point to: encode a trigger frame for an uplink (UL) multi-user (MU) communication, the trigger frame including a media access control (MAC) portion including one or more station identifications and a length field to indicate a UL physical layer convergence procedure (PLCP) protocol data unit (PPDU) (UL-PPDU) length, the MAC portion further including a duration field to indicate a time period for other stations to set network allocation vectors; configure the access point to transmit the trigger frame; and decode UL-PPDUs from one or more stations identified by the one or more stations identifications, where a length of each of the UL-PPDUs is to be the UL-PPDU length.

In Example 15, the subject matter of Example 14 optionally includes where the UL-PPDU length indicates a number of octets for the length of the UL-PPDUs.

In Example 16, the subject matter of any one or more of Examples 14-15 optionally include where the UL PPDU length indicates a value to be used for a second length field of a legacy signal field of each of the UL PPDUs.

Example 17 is a method performed by an apparatus of an access point, the method including: encoding a trigger frame for an uplink (UL) multi-user (MU) communication, the trigger frame including a media access control (MAC) portion including one or more station identifications and a length field to indicate a UL physical layer convergence procedure (PLCP) protocol data unit (PPDU) (UL-PPDU) length, the MAC portion further including a duration field to indicate a time period for other stations to set network allocation vectors; configuring the access point to transmit the trigger frame; and decoding UL-PPDUs from one or more stations identified by the one or more stations identifications, where a length of each of the UL-PPDUs is to be the UL-PPDU length.

In Example 18, the subject matter of Example 17 optionally includes where the UL-PPDU length indicates a number of octets or a time period in microseconds.

Example 19 is an apparatus of a station including memory; and processing circuitry coupled to the memory, the processing circuitry configured to: decode a trigger frame for an uplink (UL) multi-user (MU) communication, the trigger frame including a media access control (MAC) portion including a length field indicating a UL physical layer convergence procedure (PLCP) protocol data unit (PPDU) (UL-PPDU) length, the MAC portion further including a duration field to indicate a time period for other stations to set network allocation vectors, where the MAC portion further comprises a field for the station indicating a station identifier of the station, a resource unit (RU) allocation, a coding type, a modulation and coding scheme (MCS), and a spatial stream allocation for the station to use for a UL-PPDU; encode the UL-PPDU in accordance with the UL-PPDU length, the RU allocation, the coding type, the MCS, and the spatial stream allocation; and configure the station to transmit the UL-PPDU.

In Example 20, the subject matter of Example 19 optionally includes where the UL-PPDU length indicates a number of octets.

In Example 21, the subject matter of any one or more of Examples 19-20 optionally include where the UL-PPDU length indicates a time period in microseconds.

In Example 22, the subject matter of any one or more of Examples 19-21 optionally include where the duration field is set to at least extend to a time when the UL-PPDU is to have finished being transmitted.

In Example 23, the subject matter of any one or more of Examples 20-22 optionally include access point.

In Example 24, the subject matter of any one or more of Examples 20-23 optionally include transceiver circuitry coupled to the processing circuitry; and, one or more antennas coupled to the transceiver circuitry.

Example 25 is an apparatus of an access point including: means for encoding a trigger frame for an uplink (UL) multi-user (MU) communication, the trigger frame including a media access control (MAC) portion including one or more station identifications and a length field to indicate an UL physical layer convergence procedure (PLCP) protocol data unit (PPDU) (UL-PPDU) length, the MAC portion further including a duration field to indicate a time period for other stations to set network allocation vectors; means for configuring the access point to transmit the trigger frame; and means for decoding UL-PPDUs from one or more stations identified by the one or more stations identifications, where a length of each of the UL-PPDUs is to be in accordance with the UL-PPDU length.

In Example 26, the subject matter of Example 25 optionally includes where the UL-PPDU length indicates a number of octets for the length of the UL-PPDUs.

In Example 27, the subject matter of any one or more of Examples 25-26 optionally include where the trigger frame is transmitted as part of a downlink PPDU, and where the trigger frame further comprises a preamble including a legacy signal field including a second length field indicating a length of the downlink PPDU.

In Example 28, the subject matter of any one or more of Examples 25-27 optionally include where the UL-PPDU length indicates a time period in microseconds.

In Example 29, the subject matter of any one or more of Examples 25-28 optionally include where the trigger frame further comprises a second duration field to indicate a duration including a time for the UL-PPDUs to be transmitted plus a short inter frame spacing (SIFS) time and a time for a downlink (DL) multi-user (MU) block acknowledgements (BAs) or acknowledgements (ACKs) to be transmitted.

In Example 30, the subject matter of any one or more of Examples 25-29 optionally include where the MAC portion further comprises per station fields each per station field indicating a resource unit (RU) allocation, a coding type, a modulation and coding scheme (MCS), and a spatial stream allocation for a station of the one or more stations to use for a corresponding UL-PPDU of the UL-PPDUs, and further including: means for decoding the UL-PPDUs one from each of the one or more stations identified by the one or more stations identifications, where the length of each of the UL-PPDUs is to be in accordance with the UL-PPDU length, and where the decoding is in accordance with a corresponding RU allocation, a corresponding coding type, a corresponding MCS, and a corresponding spatial stream.

In Example 31, the subject matter of any one or more of Examples 25-30 optionally include where the duration field is set to a first time for transmission of the UL-PPDUs, plus a second time for a downlink (DL) multi-user (MU) block acknowledgements (BAs) or acknowledgements (ACKs) (DL MU BAs/ACKs) transmission from the access point to the one or more stations, and plus a first delay time for the one or more stations to wait to transmit the UL-PPDUs after receiving the trigger frame and a second delay time for the access point to wait before transmitting the DL MU BAs/ACKs after receiving the UL-PPDUs.

In Example 32, the subject matter of any one or more of Examples 25-31 optionally include where the duration field is set to at least extend to a time when the UL-PPDUs are to have finished being transmitted.

In Example 33, the subject matter of any one or more of Examples 25-32 optionally include means for encoding the trigger frame to further comprise downlink (DL) resource allocations in a high-efficiency (HE) signal B field for the one or more stations and encode the trigger frame to further comprise DL data in accordance with the DL resource allocations for the one of the one or more stations; and, where the duration field includes a time for the access point to transmit the encoded data.

In Example 34, the subject matter of any one or more of Examples 25-33 optionally include where the UL-PPDU length indicates a value to be used for a second length field of a legacy signal field of each of the UL-PPDUs.

In Example 35, the subject matter of any one or more of Examples 25-34 optionally include access point.

In Example 36, the subject matter of any one or more of Examples 25-35 optionally include where the one or more stations identified by the one or more stations identifications comprise at least two stations.

In Example 37, the subject matter of any one or more of Examples 25-36 optionally include means for processing received radio-frequency waves; and, means for receiving radio-frequency waves.

Example 38 is a non-transitory computer-readable storage medium that stores instructions for execution by one or more processors, the instructions to configure the one or more processors to cause an apparatus of a station to: decode a trigger frame for an uplink (UL) multi-user (MU) communication, the trigger frame including a media access control (MAC) portion including a length field indicating a UL physical layer convergence procedure (PLCP) protocol data unit (PPDU) (UL-PPDU) length, the MAC portion further including a duration field to indicate a time period for other stations to set network allocation vectors, where the MAC portion further comprises a field for the station indicating a station identifier of the station, a resource unit (RU) allocation, a coding type, a modulation and coding scheme (MCS), and a spatial stream allocation for the station to use for a UL-PPDU; encode the UL-PPDU in accordance with the UL-PPDU length, the RU allocation, the coding type, the MCS, and the spatial stream allocation; and configure the station to transmit the UL-PPDU.

In Example 39, the subject matter of Example 38 optionally includes where the UL-PPDU length indicates a number of octets.

In Example 40, the subject matter of any one or more of Examples 38-39 optionally include where the UL-PPDU length indicates a time period in microseconds.

In Example 41, the subject matter of any one or more of Examples 38-40 optionally include where the duration field is set to at least extend to a time when the UL-PPDU is to have finished being transmitted.

In Example 42, the subject matter of any one or more of Examples 38-41 optionally include access point.

Example 43 is a method performed by an apparatus of a station, the method including: decoding a trigger frame for an uplink (UL) multi-user (MU) communication, the trigger frame including a media access control (MAC) portion including a length field indicating a UL physical layer convergence procedure (PLCP) protocol data unit (PPDU) (UL-PPDU) length, the MAC portion further including a duration field to indicate a time period for other stations to set network allocation vectors, where the MAC portion further comprises a field for the station indicating a station identifier of the station, a resource unit (RU) allocation, a coding type, a modulation and coding scheme (MCS), and a spatial stream allocation for the station to use for a UL-PPDU, encoding the UL-PPDU in accordance with the UL-PPDU length, the RU allocation, the coding type, the MCS, and the spatial stream allocation; and configuring the station to transmit the UL-PPDU.

In Example 44, the subject matter of Example 43 optionally includes where the UL-PPDU length indicates a number of octets.

In Example 45, the subject matter of any one or more of Examples 43-44 optionally include where the UL-PPDU length indicates a time period in microseconds.

In Example 46, the subject matter of any one or more of Examples 38-45 optionally include where the duration field is set to at least extend to a time when the UL-PPDU is to have finished being transmitted.

In Example 47, the subject matter of any one or more of Examples 38-46 optionally include access point.

Example 48 is an apparatus of a station, the apparatus including: means for decoding a trigger frame for an uplink (UL) multi-user (MU) communication, the trigger frame including a media access control (MAC) portion including a length field indicating a UL physical layer convergence procedure (PLCP) protocol data unit (PPDU) (UL-PPDU) length, the MAC portion further including a duration field to indicate a time period for other stations to set network allocation vectors, where the MAC portion further comprises a field for the station indicating a station identifier of the station, a resource unit (ICU) allocation, a coding type, a modulation and coding scheme (MCS), and a spatial stream allocation for the station to use for a UL-PPDU; means for encoding the UL-PPDU in accordance with the UL-PPDU length, the RU allocation, the coding type, the MCS, and the spatial stream allocation; and means for configuring the station to transmit the UL-PPDU.

In Example 49, the subject matter of Example 48 optionally includes where the UL-PPDU length indicates a number of octets.

In Example 50, the subject matter of any one or more of Examples 48-49 optionally include where the UL-PPDU length indicates a time period in microseconds.

In Example 51, the subject matter of any one or more of Examples 48-50 optionally include where the duration field is set to at least extend to a time when the UL-PPDU is to have finished being transmitted.

In Example 52, the subject matter of any one or more of Examples 48-51 optionally include access point.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point comprising: memory; and processing circuitry coupled to the memory, the processing circuitry configured to:
    encode a trigger frame for an uplink (UL) multi-user (MU) communication, the trigger frame comprising a media access control (MAC) portion comprising one or more station identifications and a length field to indicate an UL physical layer convergence procedure (PLCP) protocol data unit (PPDU) (UL-PPDU) length, the MAC portion further comprising a duration field to indicate a time period for other stations to set network allocation vectors;
    configure the access point to transmit the trigger frame; and
    decode UL-PPDUs from one or more stations identified by the one or more stations identifications, wherein a length of each of the UL-PPDUs is to be in accordance with the UL-PPDU length.

2. The apparatus of claim 1, wherein the UL-PPDU length indicates a number of octets for the length of the UL-PPDUs.

3. The apparatus of claim 1, wherein the trigger frame is transmitted as part of a downlink PPDU, and wherein the trigger frame further comprises a preamble comprising a legacy signal field comprising a second length field indicating a length of the downlink PPDU.

4. The apparatus of claim 1, wherein the UL-PPDU length indicates a time period in microseconds.

5. The apparatus of claim 1, wherein the trigger frame further comprises a second duration field to indicate a duration including a time for the UL-PPDUs to be transmitted plus a short inter frame spacing (SIFS) time and a time for a downlink (DL) multi-user (MU) block acknowledgements (BAs) or acknowledgements (ACKs) to be transmitted.

6. The apparatus of claim 1, wherein the MAC portion further comprises per station fields each per station field indicating a resource unit (RU) allocation, a coding type, a modulation and coding scheme (MCS), and a spatial stream allocation for a station of the one or more stations to use for a corresponding UL-PPDU of the UL-PPDUs, and wherein the processing circuitry is further configured to:
    decode the UL-PPDUs one from each of the one or more stations identified by the one or more stations identifications, wherein the length of each of the UL-PPDUs is to be in accordance with the UL-PPDU length, and wherein the decoding is in accordance with a corresponding RU allocation, a corresponding coding type, a corresponding MCS, and a corresponding spatial stream.

7. The apparatus of claim 1, wherein the duration field is set to a first time for transmission of the UL-PPDUs, plus a second time for a downlink (DL) multi-user (MU) block acknowledgements (BAs) or acknowledgements (ACKs) (DL MU BAs/ACKs) transmission from the access point to the one or more stations, and plus a first delay time for the one or more stations to wait to transmit the UL-PPDUs after receiving the trigger frame and a second delay time for the access point to wait before transmitting the DL MU BAs/ACKs after receiving the UL-PPDUs.

8. The apparatus of claim 1, wherein the duration field is set to at least extend to a time when the UL-PPDUs are to have finished being transmitted.

9. The apparatus of claim 1, wherein the processing circuitry is further configured to:
    encode the trigger frame to further comprise downlink (DL) resource allocations in a high-efficiency (HE) signal B field for the one or more stations and encode the trigger frame to further comprise DL data in accordance with the DL resource allocations for the one of the one or more stations; and, wherein the duration field includes a time for the access point to transmit the encoded data.

10. The apparatus of claim 1, wherein the UL-PPDU length indicates a value to be used for a second length field of a legacy signal field of each of the UL-PPDUs.

11. The apparatus of claim 1, wherein the access point, the one or more stations, and the other stations are each one from the following group: an Institute of Electrical and Electronic Engineers (IEEE) 802.11ax access point, an IEEE 802.11ax station, an IEEE 802.11 station, and an IEEE 802.11 access point.

12. The apparatus of claim 1, wherein the one or more stations identified by the one or more stations identifications comprise at least two stations.

13. The apparatus of claim 11, further comprising transceiver circuitry coupled to the processing circuitry; and, one or more antennas coupled to the transceiver circuitry.

14. A non-transitory computer-readable storage medium that stores instructions for execution by one or more processors, the instructions to configure the one or more processors to cause an apparatus of an access point to:
encode a trigger frame for an uplink (UL) multi-user (MU) communication, the trigger frame comprising a media access control (MAC) portion comprising one or more station identifications and a length field to indicate a UL physical layer convergence procedure (PLCP) protocol data unit (PPDU) (UL-PPDU) length, the MAC portion further comprising a duration field to indicate a time period for other stations to set network allocation vectors;
configure the access point to transmit the trigger frame; and
decode UL-PPDUs from one or more stations identified by the one or more stations identifications, wherein a length of each of the UL-PPDUs is to be the UL-PPDU length.

15. The non-transitory computer-readable storage medium of claim 14, wherein the UL-PPDU length indicates a number of octets for the length of the UL-PPDUs.

16. The non-transitory computer-readable storage medium of claim 14, wherein the UL PPDU length indicates a value to be used for a second length field of a legacy signal field of each of the UL PPDUs.

17. A method performed by an apparatus of an access point, the method comprising:
encoding a trigger frame for an uplink (UL) multi-user (MU) communication, the trigger frame comprising a media access control (MAC) portion comprising one or more station identifications and a length field to indicate a UL physical layer convergence procedure (PLCP) protocol data unit (PPDU) (UL-PPDU) length, the MAC portion further comprising a duration field to indicate a time period for other stations to set network allocation vectors;
configuring the access point to transmit the trigger frame; and
decoding UL-PPDUs from one or more stations identified by the one or more stations identifications, wherein a length of each of the UL-PPDUs is to be the UL-PPDU length.

18. The method of claim 17, wherein the UL-PPDU length indicates a number of octets or a time period in microseconds.

19. An apparatus of a station comprising memory; and processing circuitry coupled to the memory, the processing circuitry configured to:
decode a trigger frame for an uplink (UL) multi-user (MU) communication, the trigger frame comprising a media access control (MAC) portion comprising a length field indicating a UL physical layer convergence procedure (PLCP) protocol data unit (PPDU) (UL-PPDU) length, the MAC portion further comprising a duration field to indicate a time period for other stations to set network allocation vectors, wherein the MAC portion further comprises a field for the station indicating a station identifier of the station, a resource unit (RU) allocation, a coding type, a modulation and coding scheme (MCS), and a spatial stream allocation for the station to use for a UL-PPDU;
encode the UL-PPDU in accordance with the UL-PPDU length, the RU allocation, the coding type, the MCS, and the spatial stream allocation; and
configure the station to transmit the UL-PPDU.

20. The apparatus of claim 19, wherein the UL-PPDU length indicates a number of octets.

21. The apparatus of claim 19, wherein the UL-PPDU length indicates a time period in microseconds.

22. The apparatus of claim 19, wherein the duration field is set to at least extend to a time when the UL-PPDU is to have finished being transmitted.

23. The apparatus of claim 20, wherein the station and the other stations are each one from the following group: an Institute of Electrical and Electronic Engineers (IEEE) 802.11ax access point, an IEEE 802.11ax station, an IEEE 802.11 station, and an IEEE 802.11 access point.

24. The apparatus of claim 19, further comprising transceiver circuitry coupled to the processing circuitry; and, one or more antennas coupled to the transceiver circuitry.

* * * * *